Oct. 30, 1928.                                                         1,689,613
                            O. U. ZERK
                     AUTOMATIC LUBRICANT CUP
                       Filed Aug. 11, 1924
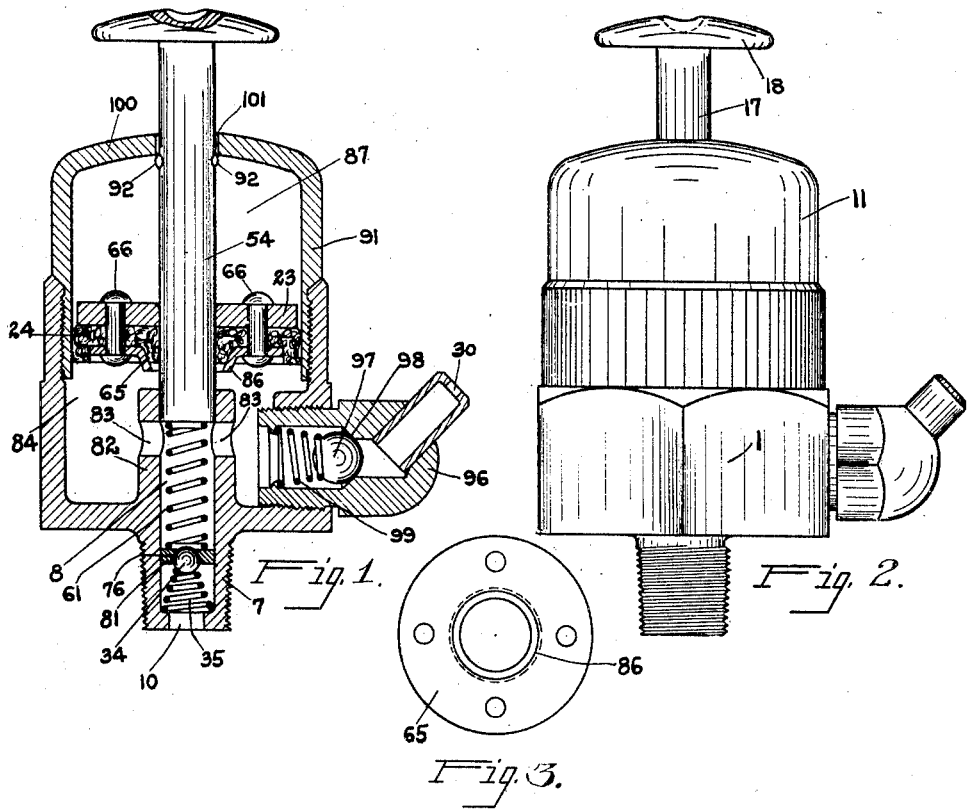

Patented Oct. 30, 1928.

1,689,613

UNITED STATES PATENT OFFICE.

OSCAR ULYSSES ZERK, OF NEWARK, NEW JERSEY, ASSIGNOR, BY MESNE ASSIGNMENTS, TO THE BASSICK MANUFACTURING COMPANY.

AUTOMATIC LUBRICANT CUP.

Original application filed July 5, 1923, Serial No. 649,703. Divided and this application filed August 11, 1924. Serial No. 731,300.

My invention relates to automatic lubricant cups and particularly to lubricant cups which are adapted to be permanently secured to adjacent bearings, such as the bearings of an automobile.

One of the objects of my invention is the provision of such lubricant cups adapted to be charged with grease or oil, or other lubricating material, which may be subsequently discharged at intervals to the bearing surfaces, such discharge being accomplished at relatively high pressure.

Another object of my invention is the provision of such lubricant cups which may be charged by a quickly detachable lubricant pump or gun which is capable of injecting lubricant into the cup at high pressure.

Another object of my invention is the provision of lubricant storing and dispensing apparatus which, during the active charging of the same with lubricant under pressure, will permit a portion of the lubricant to pass to the bearing surfaces and the rest of the lubricant, comprising the charge to be stored, passes within the apparatus for subsequent ejection to the bearing surfaces from the apparatus.

Another object of my invention is the provision of an automatic lubricant containing and dispensing cup which will operate to discharge a predetermined amount of lubricant to the bearing surfaces at each like operation of the discharging means therefor, and which will prevent the inclusion of air with the lubricant during or subsequent to such discharging operation.

Other objects and advantages of my invention will appear more fully from the following description and from the accompanying drawings in which similar characters of reference indicate similar parts throughout the several views.

This application is a division of my prior application, Serial No. 649,703, filed July 5, 1923, for improvements in automatic lubricant cups.

Referring to the drawings:

Figure 1 is a vertical, medial, longitudinal section of my improved lubricant cup;

Figure 2 is a side elevational view of the same; and

Figure 3 is a bottom plan view of the form of washer employed in this lubricant cup.

Referring to Figures 1 and 2, 1 indicates the metal casing of my lubricant cup which may consist of a casing member having a downwardly extending, externally threaded stem 7, the stem 7 having an axial bore 8 with substantially cylindrical side walls, the bore 8 terminating in a smaller counter-bore 10 at the lower end of the stem 7. Within the casing 1 the stem 7 extends upwardly, protruding into the casing, with a similar stem 82 having a cross bore 83 communicating therewith.

The tubular stem 7 is provided with a valve seat 81 consisting of a metal partition having a force fit with the bore 8 of the stem 7, the partition 81 being provided with a central aperture capable of being closed by a ball valve 76 which is biased to closed position by a conical spring 35 co-operating with the said ball and with the shoulder provided at the base of the stem 7 by the counter-bore 10.

The casing 1 is laterally bored and threaded to receive the nipple 96 which consists of a substantially tubular element having an interior seating surface 98 and an outwardly seating spring pressed ball 97 capable of co-operating with said seating surface to close the opening through said nipple. The nipple 96 is provided with an inlet orifice 30 capable of being used for a quick detachable connection with a lubricant pressure device or gun, in such manner that when lubricant is forced through the inlet orifice 30, the ball 98 will be forced from its seat, permitting the passage of lubricant into the cup, but on cessation of the pressure injecting said lubricant the ball 98 will return to its seat, preventing egress of said lubricant.

The casing 1 may be internally threaded at its upper end and provided with a cap 91 which is externally threaded to fit the casing 1 and which is provided at its upper end with an aperture 101, substantially in alignment with the bore 8 of the stem 7. The plunger rod 54 consists of a substantially cylindrical rod adapted to be received in the aperture 101 and the bore 8, making a close fit with the bore 8 so that it may act as a plunger therein forcing lubricant before it through the aperture in the partition 81, unseating the ball valve 76 and permitting lubricant to pass to the bearing to be lubricated. The plunger rod 54 is provided at its upper end with an enlarged knob 18 providing a substantial surface for inward manipulation, and the plunger rod 54 is also provided with laterally extending bosses 92 formed on the rod 54 to act as stops against the cover 91, limiting the outward movement of the plunger rod 54.

In order to maintain the plunger rod in its outward position, shown in Figure 1, there is provided a spring 61 within the bore 8 pressing against the partition 81 and the lower end of the rod 54, maintaining the rod in its uppermost position, and the rod 54 should be of such length that in its uppermost position the cross bore 83 has open communication with the bore 8 of the stem 7.

The plunger rod 54 is provided with a movable wall surrounding the said plunger rod and adapted to reciprocate upon it and contacting with the interior wall of the casing 91 to form a movable wall. This movable wall consists of a metallic disc 23 having a central aperture to receive the plunger rod 54, a leather cup washer element 24 and a special washer 65, these three elements being riveted together by rivets 66.

The special washer 65 is best illustrated in Figure 3 and comprises a downwardly turned flange portion 86 which is adapted to contact with the upper surface of the boss 82 so as to limit the downward movement of the movable wall.

The washer 24, herein described as being made of leather, may be made of felt or other material adapted to make closure against the escape of lubricant from the chamber 84 below the wall to the chamber 87 above the wall, and the said washer maintains contact at its periphery with the walls of the upper inverted cap 91 and engages at its inner portions with the cylindrical plunger rod 54.

The operation of my invention is as follows: Assuming that the stem 7 has been threaded into the bearing adjacent the moving elements to be lubricated so that the cup is in communication with the surface to be lubricated, a lubricant pressure device may be applied to the inlet orifice 30 and lubricant under pressure forced into this orifice, unseating the ball 98, the lubricant passing into the chamber 84, the bore 83 and the bore 8 filling the same and forcing the movable wall upward upon the plunger rod 54 until the movable wall has reached the limit of its upward movement against the casing 91. Thereafter, lubricant may still be forced into the lubricant cup, unseating the ball valve 76 and forcing the lubricant into the bearing to be lubricated to such an extent as is desired.

When the lubricant pressure device is removed from the inlet orifice 30, the ball valves 97 and 76 will seat, preventing the egress of the lubricant from the cup through the orifice 30 and preventing the return of the lubricant from the bearing to the cup through the partition 81. At such intervals thereafter as are desired the plunger rod 54 may be actuated by bringing pressure to bear upon the knob 18, compressing the spring 61 and forcing the lubricant which is within the bore 8 through the partition 81, unseating the ball valve 76 and forcing a predetermined amount of lubricant into and about the bearing to be lubricated. Upon the release of the knob 18 the plunger rod 54 will be returned to its uppermost position by the spring 61, but prior to such return the ball valve 76 will seat, preventing the return of lubricant into the bore 8 forming a partial vacuum therein. The external air pressure upon the movable wall and washer 24, which pressure has access to the chamber 87 through the aperture 101, will tend to press the movable wall down upon the lubricant, forcing lubricant into the bore 83 and filling the bore 8 in such manner that after every actuation of the rod 54, the bore 8 is effectively and automatically filled with a new charge of lubricant until the lubricant cup has become so nearly empty that the washer 86 contacts with the upper end of the boss 82 which acts as a stop.

It will thus be observed that I have provided a lubricant cup capable of receiving, storing and dispensing lubricant which may be discharged in predetermined amounts to the bearing surfaces by a plurality of operations, and that this result is accomplished by the simple provision of a movable wall which does not require any springs or other means for actuating said wall.

While I have illustrated and described a specific embodiment of my invention, this is capable of many modifications without departing from the spirit of the invention and I do not wish to be limited to the precise details set forth but desire to avail myself of all changes within the scope of the appended claims.

I claim:

1. A lubricant feeding device comprising a receptacle having an inlet, an outlet tube extending partly within the contour of said receptacle, ejecting means operating in said outlet passage, and a movable wall for separating a mass of lubricant from a body of air above said wall, said outlet tube forming an abutment to limit the movement of said wall.

2. A lubricant feeding device comprising a receptacle having an inlet, an outlet tube extending partly within the contour of said receptacle, ejecting means operating in said outlet passage, and a movable wall for separating a mass of lubricant from a body of air above said wall, said outlet tube forming an abutment to limit the movement of said wall, said outlet tube having lateral ports opening into said receptacle at all times independently of the position of said follower.

3. A lubricant feeding device comprising a receptacle having an inlet, an outlet tube extending partly within the contour of said receptacle, a movable wall for separating a mass of lubricant from a body of air above said wall, said outlet tube forming an abutment to limit the movement of said wall, and a plunger slidable through said wall and movable into said outlet tube to trap lubricant therein and eject it.

4. A lubricant feeding device comprising a receptacle having an inlet, an outlet tube extending partly within the contour of said receptacle, a movable wall for separating a mass of lubricant from a body of air above said wall, said outlet tube forming an abutment to limit the movement of said wall, and a plunger movable into said outlet tube to trap lubricant therein and eject it.

5. A lubricant feeding device comprising a receptacle having an inlet, an outlet tube extending partly within the contour of said receptacle, a movable wall for separating a mass of lubricant from a body of air above said wall, said outlet tube forming an abutment to limit the movement of said wall, a plunger movable into said outlet tube to trap lubricant therein and eject it, and a return spring for said plunger, said return spring being housed in said outlet tube.

6. A lubricant feeding device comprising a receptacle having an inlet and an outlet passage, ejecting means operating in said outlet passage, a movable wall for separating a mass of lubricant from a body of air above said wall, and a return spring for said ejecting means, said return spring being located below said wall and in the lubricant.

7. A lubricant feeding device comprising a receptacle having an inlet, an outlet tube extending into the receptacle, means for ejecting the contents of said receptacle through said tube, and a movable partition for separating a mass of lubricant from a body of air above said partition, said receptacle being formed in two axially alined portions, the upper portion being of a simple cup shape, the lower portion having said outlet tube formed therein, said movable partition operating entirely in the upper portion, and said tube forming an abutment to limit the movement of said movable partition.

8. A lubricant feeding device comprising a receptacle having an inlet, an outlet tube extending into the receptacle, means for ejecting the contents of said receptacle through said tube, and a movable partition for separating a mass of lubricant from a body of air above said partition, said receptacle being formed in two axially alined portions, the upper portion being of a simple cup shape, the lower portion having said outlet tube formed therein, said movable partition operating entirely in the upper portion.

9. In a lubricant dispensing device, a receptacle having an outlet tube extending thereinto, said tube having an aperture in its side communicating with said receptacle, a plunger rod adapted to be reciprocated in said tube, stop means to limit the upward movement of said rod, spring means to bias said rod to a position above said aperture, a spring pressed valve seating inwardly in said tube, and a movable wall in said receptacle adapted to reciprocate therein by pressure of the external air.

10. In a lubricant dispensing device, a receptacle having an outlet tube extending thereinto, said tube having an aperture in its side communicating with said receptacle, a plunger rod adapted to be reciprocated in said tube, stop means to limit the upward movement of said rod, spring means to bias said rod to a position above said aperture, a spring pressed valve seating inwardly in said tube, a movable wall in said receptacle adapted to reciprocate therein by pressure of the external air, said tube serving as a stop for said wall, and an inlet tube in said receptacle having an outwardly seating spring valve.

In testimony whereof I hereunto affix my signature this fourth day of August, 1924.

OSCAR U. ZERK.